United States Patent
Tang et al.

(10) Patent No.: US 11,327,762 B2
(45) Date of Patent: May 10, 2022

(54) METHOD AND APPARATUS FOR INSTRUCTION PREFETCHING WITH ALTERNATING BUFFERS AND SEQUENTIAL INSTRUCTION ADDRESS MATCHING

(71) Applicant: BEIJING BAIDU NETCOM SCIENCE AND TECHNOLOGY CO., LTD., Beijing (CN)

(72) Inventors: Chao Tang, Beijing (CN); Xueliang Du, Beijing (CN); Yingnan Xu, Beijing (CN)

(73) Assignee: KUNLUNXIN TECHNOLOGY (BEIJING) COMPANY LIMITED, Beijing (CN)

( * ) Notice: Subject to any disclaimer, the term of this patent is extended or adjusted under 35 U.S.C. 154(b) by 0 days.

(21) Appl. No.: 17/036,596

(22) Filed: Sep. 29, 2020

(65) Prior Publication Data
US 2021/0173653 A1  Jun. 10, 2021

(30) Foreign Application Priority Data
Dec. 4, 2019 (CN) .......................... 201911225633.1

(51) Int. Cl.
G06F 9/30 (2018.01)
G06F 9/38 (2018.01)

(52) U.S. Cl.
CPC ........ *G06F 9/3804* (2013.01); *G06F 9/30047* (2013.01); *G06F 9/3814* (2013.01); *G06F 9/3844* (2013.01); *G06F 9/3861* (2013.01)

(58) Field of Classification Search
CPC .... G06F 9/3802; G06F 9/3804; G06F 9/3806; G06F 9/3814
See application file for complete search history.

(56) References Cited

U.S. PATENT DOCUMENTS 4,532,589 A * 7/1985 Shintani ................ G06F 9/3824
    712/217
5,623,615 A * 4/1997 Salem ................... G06F 9/3814
    712/238

(Continued)

FOREIGN PATENT DOCUMENTS

JP  H05313894 A  11/1993
JP  H0877000 A   3/1996

(Continued)

OTHER PUBLICATIONS

European Patent Application 20211430.2, extended Search Report and opinion dated Apr. 26, 2021, 11 pages.

(Continued)

*Primary Examiner* — David J. Huisman
(74) *Attorney, Agent, or Firm* — Lathrop GPM LLP

(57) ABSTRACT

An instruction prefetching method, a device and a medium are provided. The method includes the following: instructions in a target buffer are precompiled before a processor core fetches a required instruction from the target buffer corresponding to the processor core; if it is determined that a jump instruction exists in the target buffer and a jump target instruction corresponding to the jump instruction is not cached in the target buffer according to a precompiled result, the jump target instruction is prefetched from an icache into a candidate buffer corresponding to the processor core to wait for the processor core to fetch the jump target instruction from the candidate buffer; the target buffer and the candidate buffer are alternately reused during instruction prefetching.

16 Claims, 2 Drawing Sheets

(56) References Cited

U.S. PATENT DOCUMENTS

| | | | |
|---|---|---|---|
| 5,664,135 A | 9/1997 | Schlansker et al. | |
| 5,794,027 A * | 8/1998 | Grohoski | G06F 9/3804 |
| | | | 712/200 |
| 6,604,191 B1 * | 8/2003 | Flacks | G06F 9/3802 |
| | | | 711/E12.02 |
| 7,134,004 B1 * | 11/2006 | Tago | G06F 9/3804 |
| | | | 712/235 |
| 2007/0174599 A1 | 7/2007 | Dowling | |

FOREIGN PATENT DOCUMENTS

| | | |
|---|---|---|
| KR | 20190121313 A | 10/2019 |
| WO | WO 2018142140 A1 | 8/2019 |

OTHER PUBLICATIONS

Multiple buffering, Wikipedia dated Sep. 27, 2019, accessed Apr. 8, 2021, https://en.wikipedia.org/w/index.php?title=Multiple_buffering&oldid=918104877, 5 pages.

Korean Patent Application 10-2020-0099856, Office Action dated Aug. 30, 2021, 5 pages.

Korean Patent Application 10-2020-0099856, English translation of Office Action dated Aug. 30, 2021, 5 pages.

Japanese Patent Application 2020-201010, Office Action dated Dec. 28, 2021, 4 pages.

Japanese Patent Application 2020-201010, English translation of Office Action dated Dec. 28, 2021, 3 pages.

* cited by examiner

METHOD AND APPARATUS FOR INSTRUCTION PREFETCHING WITH ALTERNATING BUFFERS AND SEQUENTIAL INSTRUCTION ADDRESS MATCHING

CROSS REFERENCE TO RELATED APPLICATIONS

This application is based on and claims priority to Chinese patent application Serial No. 201911225633.1 filed on Dec. 4, 2019, the entire contents of which are incorporated herein by reference.

FIELD

Embodiments of the present disclosure relate to a computer technology, and specifically, to a data storage technology, and particularly, to an instruction prefetching method, a device, and a medium.

BACKGROUND

An instruction prefetching operation is widely used in various processors to improve performance of the processors. Currently, for a multi-core processor, the instruction prefetching operation is mainly implemented in the following two schemes.

In scheme 1, a one-level register cache is added in each processor core, and a cache size generally refers to a cacheline of an icache (instruction cache). A plurality of instructions are read from the icache at one time and the plurality of instructions are stored into the added register cache. Upon completion of performing the instructions in the added register cache, a plurality of instructions are read from the icache again. When operations such an instruction branching operation, an instruction jumping operation and the like occur in each processor core, if a jump address (pc value) is not in the register cache, it is required to wait for the core to read instructions from the icache into the register cache, which causes a long latency and affects performance of the processor. Moreover, if the size of the register cache is consistent with the cacheline of the icache, in order to avoid that currently read instructions override the instructions cached previously, a next instruction fetching operation may be started after the instructions cached previously are performed completely, which further causes an increased latency time for fetching instructions.

In scheme 2, a one-level icache is added in each processor core to reduce the latency time of fetching instructions for a multi-core competition. Each core reads instructions from the icache of the core itself. When the read instruction is not in the icache of the core, the core initiates a read request to an upper-level icache. However, adding the one-level icache in each processor core will undoubtedly increase an overall area of the processor, and increase a processing and manufacturing cost of the processor.

SUMMARY

Embodiments of the present disclosure disclose an instruction prefetching method and apparatus, a device and a medium.

In a first aspect, embodiments of the present disclosure disclose an instruction prefetching method. The method includes: before a processor core fetches a required instruction from a target buffer corresponding to the processor core, precompiling instructions in the target buffer; in response to determining that a jump instruction exists in the target buffer and a first jump target instruction corresponding to the jump instruction is not cached in the target buffer according to a precompiled result, prefetching the first jump target instruction from an instruction cache (icache) into a candidate buffer corresponding to the processor core to wait for the processor core to fetch the first jump target instruction from the candidate buffer. The target buffer and the candidate buffer are alternately reused during instruction prefetching. Precompiling the instructions in the target buffer includes precompiling the instructions in the target buffer by using a branch prediction algorithm. After precompiling the instructions in the target buffer, the method further includes in response to receiving prediction failure information, sequentially executing an instruction address matching using a register of the target buffer and a register of the candidate buffer in a process of executing a target jump instruction by the processor core, to determine a buffer where a second jump target instruction corresponding to the target jump instruction is located.

An embodiment in the above application has the following advantages or benefits. By precompiling the instructions and dynamically using the two buffers, the efficiency for fetching instructions by each processor core is improved, the latency time for fetching instructions is reduced and the influence of the overriding of the cached instructions on the running of the processor is reduced on the basis of not increasing the processing and manufacturing cost of the processor.

An embodiment in the above application has the following advantages or benefits. By using the minimum instruction address in the uncached branch instruction as the head address, more demand instructions may be prefetched as far as possible on the basis of ensuring that the branch instruction which may be executed firstly is prefetched.

An embodiment in the above application has the following advantages or benefits. Because the two buffers are both adopted to execute the instruction prefetching, more instructions may be cached as much as possible during the instruction prefetching by alternately utilizing the two buffers, and even if a branch instruction prediction fails, the branch instruction prefetching may be realized to a greater extent, so that a waiting time for re-fetching the branch instruction is reduced.

In a second aspect, embodiments of the present disclosure disclose an instruction prefetching apparatus, the apparatus includes an instruction precompiling module and an instruction prefetching module. The instruction precompiling module is configured to precompile instructions in a target buffer before a processor core fetches a required instruction from the target buffer corresponding to the processor core. The instruction prefetching module is configured to, in response to determining that a jump instruction exists in the target buffer and a jump target instruction corresponding to the jump instruction is not cached in the target buffer according to a precompiled result, prefetch the jump target instruction from an instruction cache (icache) into a candidate buffer corresponding to the processor core to wait for the processor core to fetch the jump target instruction from the candidate buffer. The target buffer and the candidate buffer are alternately reused during the instruction prefetching.

In a third aspect, embodiments of the present disclosure further disclose an electronic device, the electronic device includes at least one processor and a memory communicatively coupled to the at least one processor. The memory stores instructions executable by the at least one processor, when the instructions are executed by the at least one processor, the at least one processor is caused to perform the method according to any one of the embodiments of the present disclosure.

In a fourth aspect, embodiments of the present disclosure further disclose a non-transitory computer readable storage medium, having computer instructions stored thereon for causing a computer to perform the method according to any one of the embodiments of the present disclosure.

BRIEF DESCRIPTION OF THE DRAWINGS

The drawings are included to provide a better understanding of the present disclosure and are not to be considered limiting of the present disclosure.

DETAILED DESCRIPTION

The following description of exemplary embodiments of the present disclosure, taken in conjunction with the drawings, includes various details of embodiments of the present disclosure to assist in understanding, which are to be considered exemplary only. Accordingly, those ordinary skilled in the art will recognize that various changes and modifications of the embodiments described herein can be made without departing from the scope and spirit of the present disclosure. Also, descriptions of well-known functions and constructions are omitted in the following description for clarity and conciseness.

Figure 1:
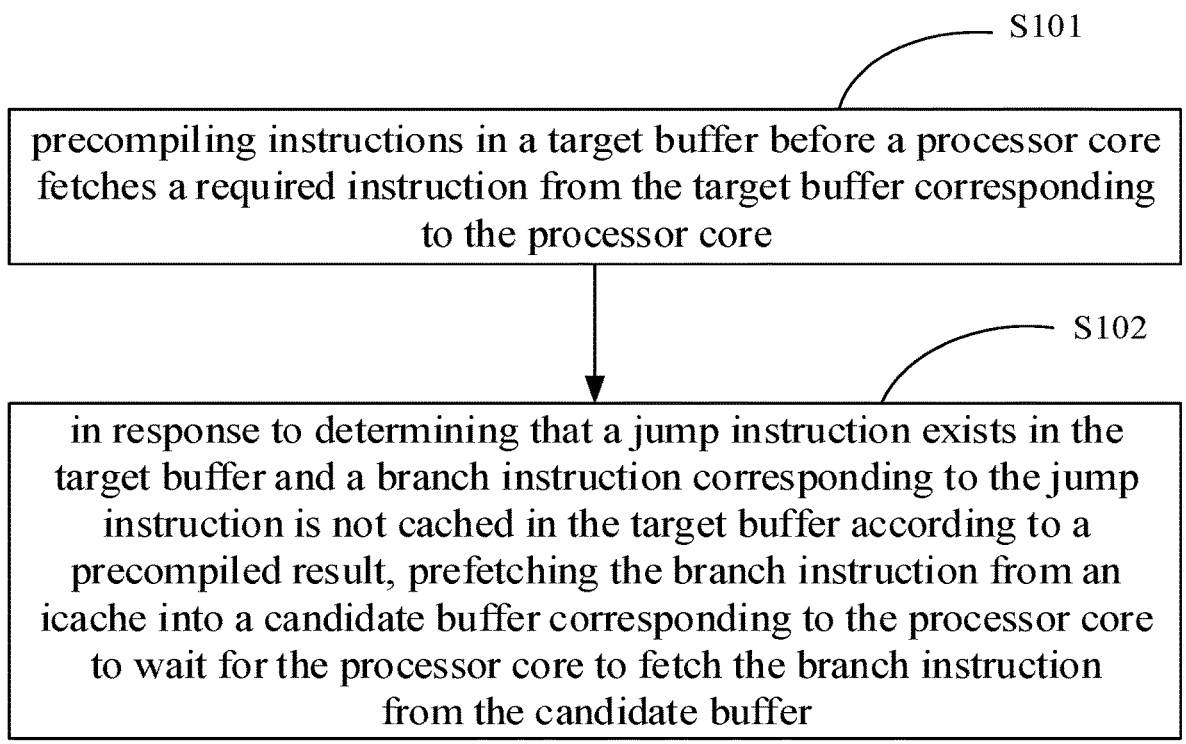
FIG. 1 is a flow chart of an instruction prefetching method according to an embodiment of the present disclosure.

FIG. 1 is a flow chart of an instruction prefetching method according to an embodiment of the present disclosure, and the embodiment may be applied to reduce a latency time for fetching instructions by each core of a processor when a jump instruction exists. The method of the embodiment may be executed by an instruction prefetching apparatus, which may be implemented in software and/or hardware, and may be integrated on any electronic device with a computing capability, where a processor of the electronic device includes at least one core.

In the embodiment, for the processor including at least one core, two buffer areas (buffers) may be set for each core in advance, which may be respectively identified as a target buffer and a candidate buffer, that is, each processor core corresponds to one target buffer and one candidate buffer. The buffer is a storage area in a device memory, and if the device memory is increased in order to reserve enough available buffer, an area and a manufacturing cost of the processor are not increased. The target buffer refers to a current instruction prefetching buffer of the processor core in a running process of the processor core, and the candidate buffer is used for caching a specific instruction not cached in the target buffer in advance. For example, before the processor fetches a required instruction, the processor core executes an instruction address matching in a register to determine a buffer where the required instruction is located, and then the buffer is considered as a current target buffer. As the instructions are read and processed, roles of the two buffers may be exchanged continually.

When the processor core has an instruction fetching requirement, firstly, two buffers are accessed to fetch the required instruction, and when it is determined that the two buffers do not have the required instruction, an upper-level instruction cache (icache) is accessed to fetch the required instruction and cache the required instruction in the buffer so as to wait for the processor core to fetch the required instruction. Sizes of the target buffer and the candidate buffer are related to a cacheline of the icache, and may be set according to actual requirements, for example, the size of each buffer may be set based on one cacheline of the icache. For the purpose of explaining embodiments of the present disclosure, the following specifically takes one processor core as an example to exemplify the present disclosure.

As illustrated in FIG. 1, the instruction prefetching method disclosed in the embodiment may include the following.

In block S101, before the processor core fetches the required instruction from the target buffer corresponding to the processor core, instructions in the target buffer are precompiled.

The precompiling or predecoding refers to compiling the instructions in the buffer in advance, to determine a jump instruction among the instructions in the buffer and a jump target instruction corresponding to the jump instruction. The jump instruction refers to a specific instruction that will cause the processor core to jump to execute a next associated instruction after the jump instruction is executed by the processor core. The jump instruction determined by instruction precompiling includes an inevitable jump instruction and a predicted jump instruction. The inevitable jump instruction refers to an instruction that the instruction jumping must be executed after the instruction is executed, and the predicted jump instruction refers to an instruction that the instruction jumping may be executed at a certain probability or may not be executed after the instruction is executed. With respect to an implementation of instruction precompiling or predecoding, any instruction precompiling technique available in the art may be utilized, for example, the instruction precompiling may be executed using an instruction predecoder in a processor, and the jump target instruction of the instruction jumping may be predicted using any instruction branch prediction algorithm available in the art.

In the embodiment, precompiling the instructions in the target buffer includes precompiling each instruction in the target buffer, or compiling instructions whose addresses are equal to and greater than an address of the currently required instruction of the processor core, so as to determine whether the jump instruction exists in the instructions whose addresses are equal to and greater than the address of the currently required instruction of the processor core. The precompiling of the instructions may be executed in a parallel manner. While the two buffers are set for each processor core, registers are respectively allocated to the two buffers for recording the addresses of the instructions cached in the respective buffers. After the jump target instruction corresponding to the jump instruction in the target buffer is determined through the instruction precompiling, it may be determined whether the jump target instruction is cached in the target buffer through the instruction address matching in the register of the target buffer.

By precompiling the instructions in the target buffer before the processor core fetches the required instruction from the target buffer corresponding to the processor core, the plurality of instructions at least including the required instruction are precompiled before executing the required instruction, and the jump target instruction not cached in the target buffer may be cached in the candidate buffer in advance, so that a waiting time for fetching the jump target instruction is reduced, and a latency time for fetching instructions is reduced. In addition, by prefetching and caching the instruction in another buffer other than the target buffer, overriding of an unexecuted instruction in the target buffer may be avoided, and an influence of overriding of a cached instruction on running of the processor is further reduced.

In block S102, if it is determined that the jump instruction exists in the target buffer and the jump target instruction corresponding to the jump instruction is not cached in the target buffer according to a precompiled result, the uncached jump target instruction is prefetched from the icache into the candidate buffer corresponding to the processor core to wait for the processor core to fetch the jump target instruction from the candidate buffer.

Specifically, the jump target instruction may include a plurality of instructions, the instructions not cached in the target buffer in the jump target instruction corresponding to the unfetched jump instruction or the unexecuted jump instruction are fetched in advance from an upper-level icache and cached in the candidate buffer. Illustratively, the target buffer and the candidate buffer are respectively denoted as buffer 0 and buffer 1, a total of 16 instructions with instruction addresses of 1-16 are cached in the target buffer (buffer 0), before the processor core fetches a required instruction with an address of 9 from the target buffer (buffer 0), it is determined that the instructions with the addresses of 11, 13 and 15 are jump instructions through the instruction precompiling, and the address of the jump target instruction corresponding to the jump instruction with the address of 11 is 14, the address of the jump target instruction corresponding to the jump instruction with the address of 13 is 20, and the address of the jump target instruction corresponding to the jump instruction with the address of 15 is 16. Through the address matching, it may be determined that the jump target instruction with the address of 20 is not cached in the target buffer (buffer 0), and then the jump target instruction with the address of 20 is cached in the candidate buffer (buffer 1) in advance by instruction prefetching, so that after the processor core executes the jump instruction with the address of 13, the instruction fetching buffer is switched from the target buffer (buffer 0) to the candidate buffer (buffer 1), and the jump target instruction with the address of 20 is fetched from the candidate buffer (buffer 1). After the switching, the candidate buffer (buffer 1) is used as a new target buffer, and the target buffer (buffer 0) is used as a new candidate buffer, that is, in the embodiment, the target buffer and the candidate buffer are alternately reused during the instruction prefetching.

Alternatively, in response to the processor core fetching the jump target instruction from the candidate buffer, the current instruction fetching buffer is switched from the target buffer to the candidate buffer; correspondingly, the method of the embodiment further includes: before the processor core fetches the jump target instruction from the candidate buffer, precompiling instructions in the candidate buffer to determine a jump target instruction not cached in the candidate buffer. That is, after the switching, the candidate buffer before the switching becomes the new target buffer, and the above-described operations in blocks S101-S102 are repeatedly executed for the candidate buffer to implement the prefetching of the jump target instruction again. With the instruction fetching of the processor core, when the instruction jumping exists, the roles of the target buffer and the candidate buffer are dynamically switched, and the instruction precompiling and the prefetching of the jump target instruction are circularly executed between the two buffers.

Alternatively, prefetching the uncached jump target instruction from the icache to the candidate buffer corresponding to the processor core includes the following. A minimum instruction address in the uncached jump target instruction is taken as a head address, a preset number of instructions are prefetched from the icache, and the preset number of instructions are cached into the candidate buffer corresponding to the processor core. The uncached jump target instruction is included in the preset number of instructions.

Continuing with the above example, in the three jump target instructions with the addresses of 14, 20, and 16, the address of 20 is considered as the head address, a total of 16 instructions with the addresses of 20-35 are prefetched from the icache, and cached in the candidate buffer. By using the minimum instruction address in the uncached jump target instruction as the head address, more required instructions may be prefetched as far as possible on the basis of ensuring that the jump target instruction which is executed firstly are prefetched. The number of instructions per prefetching is related to the cacheline of the icache, for example, the number of instructions per prefetching may be determined according to the cacheline of the icache. The instructions in the icache are stored according to the instruction address, and when the instructions are prefetched, the instructions are prefetched in sequence based on the head address of the instruction fetching.

It should be noted that, in the embodiment, if the unexecuted instruction exists in the candidate buffer before the jump target instruction is stored in the candidate buffer, the unexecuted instruction is usually considered as a useless instruction, and the unexecuted instruction may be override without affecting a normal running of the processor.

Based on the above technical solutions, alternatively, prefetching the uncached jump target instruction from the icache into the candidate buffer corresponding to the processor core includes the following. It is determined whether the uncached jump target instruction is cached in the candidate buffer corresponding to the processor core. In response to determining that the uncached jump target instruction is not cached in the candidate buffer corresponding to the processor core, the uncached jump target instruction is prefetched from the icache into the candidate buffer.

Due to the alternate reusing of the target buffer and the candidate buffer, some instructions may be cached in the candidate buffer before the instructions are fetched from the target buffer, so when the jump instruction and the corresponding jump target instruction are determined and the jump target instruction not cached in the target buffer is determined by performing the instruction precompiling on the target buffer, the address matching is further performed in the register of the candidate buffer, to determine whether the uncached jump target instruction is cached in the candidate buffer, and if it is determined that the uncached jump target instruction is cached in the candidate buffer, the instruction prefetching is not required currently, and the instructions are continuously fetched from the target buffer; if it is determined that the uncached jump target instruction is not cached in the candidate buffer, the instruction prefetching is executed to prefetch the uncached jump target instruction from the icache into the candidate buffer.

Further, if the instructions in the target buffer are precompiled and it is determined that no jump instruction exists in the target buffer, a preset number of instructions are sequentially prefetched from the icache and cached in the candidate buffer based on an instruction with a maximum instruction address in the target buffer. Continuing with the above example as an example, 16 instructions with instruction addresses of 1-16 are cached in the target buffer (buffer 0), and if it is determined that no jump instruction exists in the target buffer (buffer 0) through the instruction precompiling, 16 instructions with instruction addresses of 17-32 are sequentially prefetched from the icache and cached in the candidate buffer.

According to the technical solutions of the embodiment, by precompiling the instructions in the target buffer before the processor core fetches the required instruction from the target buffer corresponding to the processor core, the jump instruction and the corresponding jump target instruction are determined, the jump target instruction not cached in the target buffer is cached in the candidate buffer in advance to wait for the processor core to fetch the instruction. A problem of a latency time for fetching a jump target instruction in the existing instruction prefetching is solved. By dynamically using the two buffers, on the basis of not increasing the processing and manufacturing cost of the processor, the efficiency for fetching instructions by each processor core is improved, the latency time for fetching instructions is reduced and the influence of the overriding of the cached instructions on the running of the processor is reduced, and a performance of the processor is further improved.

Figure 2:
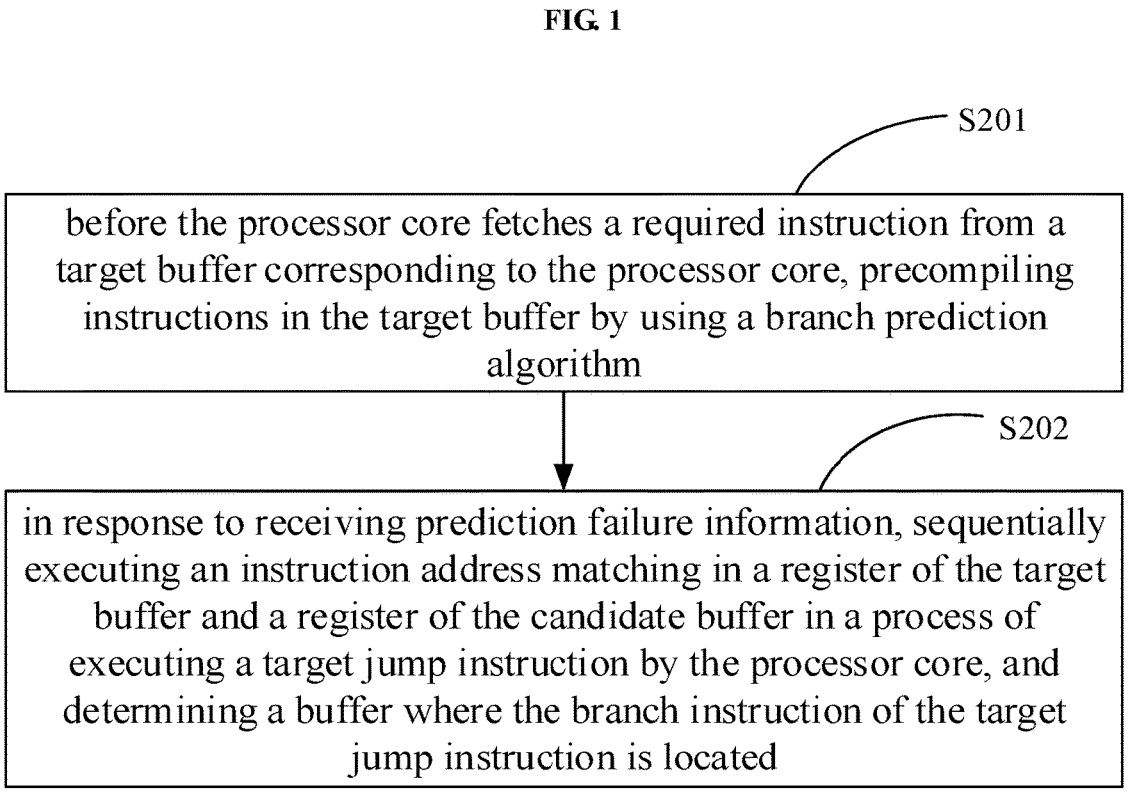
FIG. 2 is a flow chart of an instruction prefetching method according to another embodiment of the present disclosure.

FIG. 2 is a flow chart of an instruction prefetching method according to another embodiment of the present disclosure, which is further optimized and expanded based on the above technical solutions, and may be combined with the above various embodiments. As illustrated in FIG. 2, the method of this embodiment may include the following.

In block S201, before the processor core fetches the required instruction from the target buffer corresponding to the processor core, instructions in the target buffer are precompiled by using a branch prediction algorithm.

In block S202, in response to receiving prediction failure information, an instruction address matching is sequentially executed in a register of the target buffer and a register of the candidate buffer in the process of executing a target jump instruction by the processor core, to determine a buffer where a jump target instruction corresponding to the target jump instruction is located.

In the embodiment, the jump instruction determined by the instruction precompiling includes the inevitable jump instruction and the predicted jump instruction, the inevitable jump instruction refers to an instruction that the instruction jumping must be executed after the instruction is executed, and the predicted jump instruction refers to an instruction that there is the certain probability to execute the instruction jumping or the instruction jumping may not be executed after the instruction is executed.

The target instruction refers to an instruction which causes a prediction failure by using the branch prediction algorithm but actually is of a type of the jump instruction. Because the current instruction fetching buffer of the processor core is the target buffer, in the process of executing the target jump instruction, it may be determined whether the jump target instruction corresponding to the target jump instruction is cached in the target buffer, if yes, the required jump target instruction may be directly fetched from the target buffer, and if not, the determination is continuously carried out for the candidate buffer; and if it is determined that the jump target instruction corresponding to the target jump instruction is cached in the candidate buffer, the instruction fetching buffer is switched from the target buffer to the candidate buffer, that is, the candidate buffer is used as a new target buffer, and simultaneously the instruction precompiling and the jump target instruction prefetching are performed on the instructions in the candidate buffer before fetching the required instruction from the candidate buffer.

Because the two buffers are both adopted to execute the instruction prefetching in the embodiment, with the alternate reusing of the two buffers, more instructions may be cached as much as possible in the instruction prefetching, and even if the jump target instruction prediction fails, the jump target instruction prefetching may be realized to a greater extent, so that the waiting time for re-fetching the jump target instruction is reduced.

Further, the method of the embodiment further includes the following. In response to determining that the jump target instruction corresponding to the target jump instruction is not in the target buffer and the candidate buffer based on the instruction address matching, that is, the jump target instruction is not cached in the target buffer and the candidate buffer, an address of the jump target instruction corresponding to the target jump instruction is considered as the head address, a preset number of instructions are prefetched from the icache and the preset number of instructions are cached in the candidate buffer, including a replacement of the cached instructions in the candidate buffer. The preset number of instructions can be set adaptively.

Furthermore, if it is determined that the instruction currently required by the processor core is not stored in the target buffer and is not cached in the candidate buffer by performing the address matching on the registers of the two buffers, the instruction prefetching apparatus may send an instruction fetching request to the icache based on the instruction required by the processor core, so that the required instruction is read from the icache and cached in the candidate buffer. If the instruction prefetching apparatus generates another instruction fetching request in a process of fetching the instruction based on the previous instruction fetching request (including the process from sending the previous instruction fetching request to fetching the required instruction), it is judged whether the instruction address carried in the instruction fetching request generated later is consistent with the instruction address carried in the previous instruction fetching request, if yes, the instruction fetching request generated later is not required to be sent, thereby avoiding the sending of a repeated instruction fetching request and improving the efficiency for fetching instructions.

According to the technical solutions of the embodiment, because the two buffers are adopted to execute the instruction prefetching simultaneously, more instructions may be cached as much as possible in the instruction prefetching along with the alternate reusing of the two buffers, and even if the jump target instruction prediction fails, the jump target instruction prefetching may be realized to a greater extent, so that instruction address matching may be executed in the register of the target buffer and the register of the candidate buffer in sequence, to determine the buffer where the jump target instruction corresponding to the target jump instruction is located, thus the waiting time for re-fetching the jump target instruction is reduced, and the efficiency for fetching instructions is improved.

Figure 3:
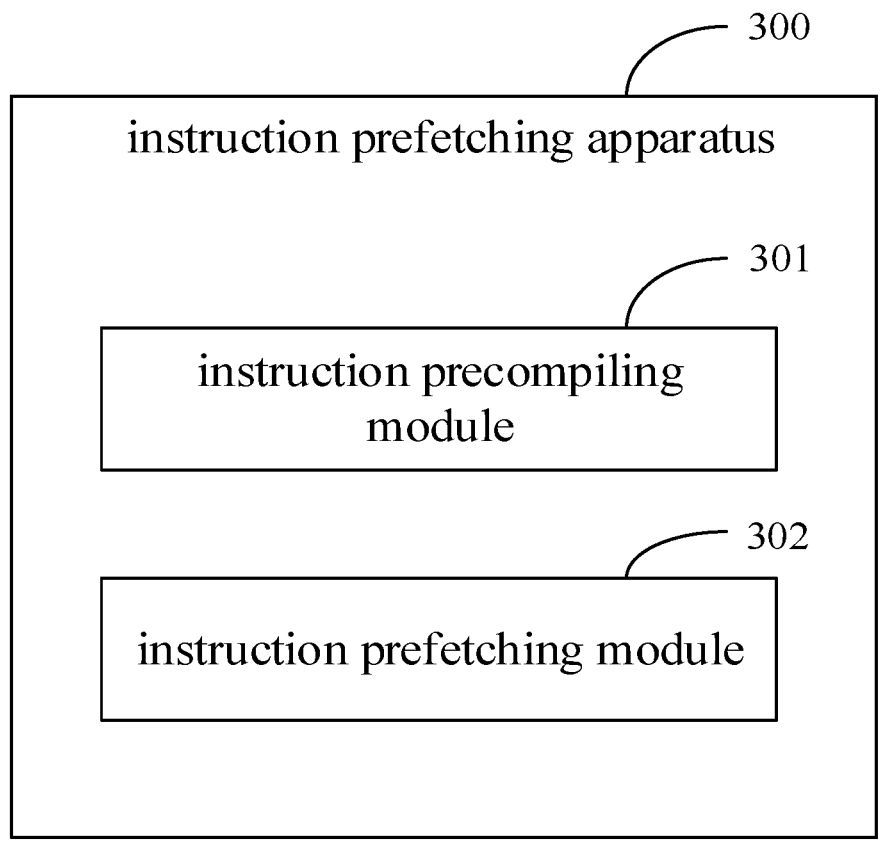
FIG. 3 is a block diagram of an instruction prefetching apparatus according to an embodiment of the present disclosure.

FIG. 3 is a block diagram of an instruction prefetching apparatus according to an embodiment of the present disclosure, and the embodiment may be applied to reduce a latency time for fetching instructions by each core of the processor when an instruction jumping exists. The apparatus of the embodiment may be implemented in software and/or hardware, and may be integrated on any electronic device with a computing capability, a processor of the electronic device includes at least one core.

As illustrated in FIG. 3, the instruction prefetching apparatus 300 disclosed in the present embodiment includes an instruction precompiling module 301 and an instruction prefetching module 302.

The instruction precompiling module 301 is configured to precompile instructions in a target buffer before the processor core fetches a required instruction from the target buffer corresponding to the processor core.

The instruction prefetching module 302 is configured to, in response to determining that a jump instruction exists in the target buffer and a jump target instruction corresponding to the jump instruction is not cached in the target buffer according to a precompiled result, prefetch the jump target instruction from the icache into the candidate buffer corresponding to the processor core to wait for the processor core to fetch the jump target instruction from the candidate buffer.

The target buffer and the candidate buffer are alternately reused during instruction prefetching.

Alternatively, the instruction prefetching module 302 is specifically configured to: in response to determining that the jump instruction exists in the target buffer and the jump target instruction corresponding to the jump instruction is not cached in the target buffer according to the precompiled result, take a minimum instruction address in the jump target instruction as a head address, prefetch a preset number of instructions from the icache, and cache the preset number of instructions into the candidate buffer corresponding to the processor core, in which the jump target instruction is included in the preset number of instructions.

Alternatively, the instruction prefetching module 302 is specifically configured to: in response to determining that the jump instruction exists in the target buffer and the jump target instruction corresponding to the jump instruction is not cached in the target buffer according to the precompiled result, determine whether the jump target instruction is cached in the candidate buffer corresponding to the processor core; in response to determining that the jump target instruction is not cached in the candidate buffer corresponding to the processor core, prefetch the jump target instruction from the icache into the candidate buffer.

Alternatively, in response to the processor core fetching the jump target instruction from the candidate buffer, a current instruction fetching buffer is switched from the target buffer to the candidate buffer; accordingly, the instruction precompiling module 301 is further configured to: before the processor core fetches the jump target instruction from the candidate buffer, precompile instructions in the candidate buffer to determine a jump target instruction not cached in the candidate buffer.

Alternatively, the instruction precompiling module 301 is specifically configured to: precompile the instructions in the target buffer by using the branch prediction algorithm.

Alternatively, the apparatus in the embodiment further includes a buffer determining module.

The buffer determining module is configured to, after the instruction precompiling module 301 executes precompiling the instructions in the target buffer, in response to receiving prediction failure information, sequentially execute an instruction address matching in a register of the target buffer and a register of the candidate buffer in the process of executing a target jump instruction by the processor core, to determine a buffer where a jump target instruction corresponding to the target jump instruction is located.

Alternatively, the instruction prefetching module 302 is further configured to: in response to determining that the jump target instruction corresponding to the target jump instruction is not in the target buffer and the candidate buffer based on the instruction address matching, take an address of the jump target instruction corresponding to the target jump instruction as a head address, prefetch a preset number of instructions from the icache and cache the preset number of instructions in the candidate buffer.

The instruction prefetching apparatus 300 disclosed in the embodiment of the present disclosure may execute the instruction prefetching method disclosed in the embodiment of the present disclosure, and has corresponding functional modules and beneficial effects for executing method. Reference may be made to the description of any method embodiment of the present disclosure for the content not explicitly described in the embodiment.

According to an embodiment of the present disclosure, an electronic device and a readable storage medium are also provided.

Figure 4:
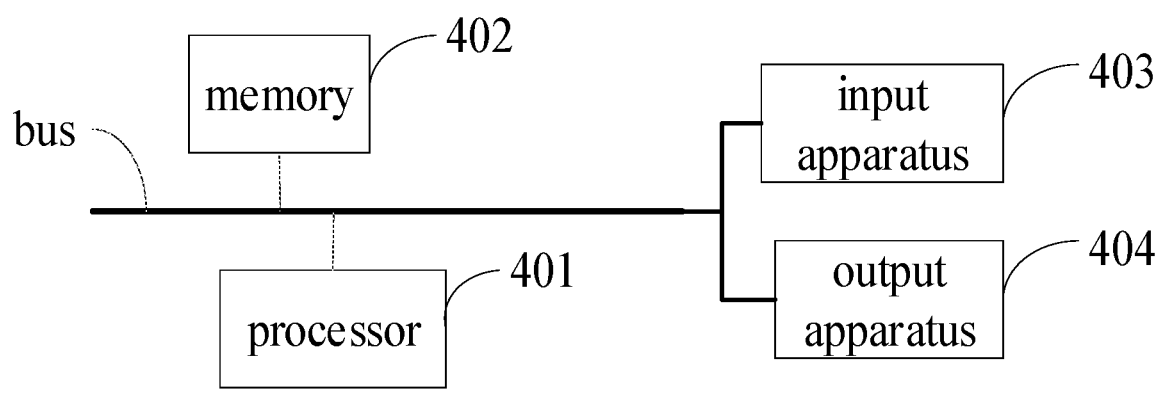
FIG. 4 is a block diagram of an electronic device according to an embodiment of the present disclosure.

As illustrated in FIG. 4, FIG. 4 is a block diagram of an electronic device for implementing the instruction prefetching method in the embodiment of the present disclosure. The electronic device is intended to represent various forms of digital computers, such as a laptop, a desktop, a workstation, a personal digital assistant, a server, a blade server, a mainframe, and other appropriate computers. The electronic device may also represent various forms of mobile apparatuses, such as a personal digital processor, a cellular telephone, a smart phone, a wearable device, and other similar computing apparatuses. The components shown herein, their connections and relations, and their functions, are meant to be exemplary only, and are not meant to limit implementations of embodiments of the present disclosure described and/or claimed herein.

As illustrated in FIG. 4, the electronic device includes one or more processors 401, a memory 402, and interfaces for connecting the various components, including a high-speed interface and a low-speed interface. The various components are interconnected using different buses and may be mounted on a common motherboard or in other manners as desired. The processor may process instructions for execution within the electronic device, including instructions stored in or on the memory to display Graphical information of a Graphical User Interface (GUI) on an external input/output apparatus, such as a display device coupled to the Interface. In other implementations, multiple processors and/or multiple buses may be used, along with multiple memories and multiple memories, if desired. Also, multiple electronic devices may be connected, with each device providing some of the necessary operations, e.g., as an array of servers, a group of blade servers, or a multi-processor system. One processor 401 is illustrated in FIG. 4.

The memory 402 is a non-transitory computer readable storage medium provided by embodiments of the present disclosure. The memory stores instructions executable by at least one processor, so that the at least one processor executes the method for instruction prefetching provided by the embodiment of the present disclosure. The non-transitory computer readable storage medium of embodiments of the present disclosure stores computer instructions for causing a computer to execute the method for instruction prefetching provided by embodiments of the present disclosure.

The memory 402, which is a non-transitory computer-readable storage medium, may be used to store non-transitory software programs, non-transitory computer-executable programs, and modules, such as program instructions/modules corresponding to the method for instruction prefetching in embodiments of the present disclosure, for example, the instruction precompiling module 301 and the instruction prefetching module 302 illustrated in FIG. 3. The processor 401 executes various functional applications of the server and data processing by running non-transitory software programs, instructions, and modules stored in the memory 402, that is, implements the method for instruction prefetching in the above-described method embodiment.

The memory 402 may include a storage program area and a storage data area, the storage program area may store an operating system, an application program required by at least one function; the storage data area may store data created according to the use of the electronic device of the method for instruction prefetching, and the like. Further, the memory 402 may include high speed random access memory, and may also include a non-transitory memory, such as at least one magnetic disk storage device, a flash memory device, or other non-transitory solid state storage device. In some embodiments, the memory 402 may optionally include a memory remotely located from the processor 401 and such remote memory may be connected over a network to an electronic device for implementing the method for instruction prefetching of the present embodiment. Examples of such networks include, but are not limited to, an internet, an intranet, a local area network, a mobile communication network, and combinations thereof.

The electronic device for implementing the method for instruction prefetching in the embodiment may further include an input apparatus 403 and an output apparatus 404. The processor 401, the memory 402, the input apparatus 403, and the output apparatus 404 may be connected by a bus or other manners, as exemplified by the bus connection in FIG. 4.

The input apparatus 403 may receive input numeric or character information and generate key signal input related to a user setting and a function control of the electronic apparatus for implementing the method for instruction prefetching in the present embodiment, such as an input apparatus of a touch screen, a keypad, a mouse, a track pad, a touch pad, a pointing stick, one or more mouse buttons, a track ball, a joystick, or the like. The output apparatus 404 may include a display device, an auxiliary lighting apparatus such as a Light Emitting Diode (LED), a tactile feedback device, and the like; the tactile feedback apparatus is, for example, a vibration motor or the like. The Display device may include, but is not limited to, a Liquid Crystal Display (LCD), an LED Display, and a plasma Display. In some implementations, the display device may be the touch screen.

Various implementations of the systems and techniques described here can be implemented in a digital electronic circuit system, an integrated circuit system, an ASIC (application specific integrated circuit), a computer hardware, a firmware, a software, and/or combinations thereof. These various implementations may include the following. The system and technology may be implemented in one or more computer programs that are executable and/or interpretable on a programmable system including at least one programmable processor, which may be a special programmable processor or a general programmable processor, data and instructions are received from a storage system, at least one input apparatus, and at least one output apparatus, and data and instructions are transmitted to the storage system, the at least one input apparatus, and the at least one output apparatus.

These computer programs, also known as programs, software applications, or code, include machine instructions for a programmable processor, and may be implemented using high-level procedural and/or object-oriented programming languages, and/or assembly/machine languages. As used herein, the terms "machine-readable medium" and "computer readable medium" refer to any computer program product, device, and/or apparatus (e.g., a magnetic disc, an optical disk, a memory, a Programmable Logic Device (PLD)) used to provide the machine instructions and/or data to the programmable processor, including a machine-readable medium that receives the machine instructions as a machine-readable signal. The term "machine-readable signal" refers to any signal used to provide the machine instructions and/or data to a programmable processor.

To provide for an interaction with a user, the system and technology described herein may be implemented on the computer having a display apparatus (e.g., a CRT (cathode ray tube) or LCD (liquid crystal display) monitor) for displaying information to the user; and a keyboard and a pointing apparatus (e.g., a mouse or a trackball) by which the user may provide an input to the computer. Other kinds of apparatuses may also be used to provide for the interaction with the user; for example, a feedback provided to the user may be any form of a sensory feedback (e.g., a visual feedback, an auditory feedback, or a tactile feedback); and the input from the user may be received in any form, including an acoustic input, a speech input, or a tactile input.

The system and technology described herein may be implemented in a computing system that includes a back-end component (e.g., as a data server), or that includes a middleware component (e.g., an application server), or that includes a front-end component (e.g., the user computer having a graphical user interface or a web browser through which the user may interact with an implementation of the system and the technology described herein), or any combination of such back-end, middleware, or front-end components. The components of the system may be interconnected by any form or medium of digital data communication (e.g., a communication network). Examples of communication networks include a local Area Networks (LAN), a Wide Area Networks (WAN), and the Internet.

The computer system may include a client and a server. The client and the server are generally remote from each other and typically interact through the communication network. The relation of the client and the server arises by a virtue of computer programs running on the respective computers and having a client-server relation to each other.

According to the technical solutions of the embodiment, before the processor core fetches the required instruction from the target buffer corresponding to the processor core, the instructions in the target buffer are precompiled, the jump instruction and the corresponding jump target instruction are determined, the jump target instruction not cached in the target buffer is cached in the candidate buffer in advance to wait for the processor core to fetch the jump target instruction, the problem of a latency time for fetching jump target instruction in the existing instruction prefetching is solved, through the dynamic utilization of two buffers, on the basis of not increasing the processing and manufacturing cost of the processor, the efficiency for fetching instructions by each processor core is improved, the latency time for fetching instructions is reduced, and the influence of the overriding of the cached instruction on the running of the processor is reduced.

It should be understood that, various forms of flows shown above may be used to reorder, add or delete the steps.

For example, the steps described in the present disclosure may be executed in parallel, sequentially, or in different orders, and are not limited herein as long as the desired results of the technical schemes disclosed in the present disclosure may be achieved.

The above-described embodiments are not intended to limit the scope of the present disclosure. It should be understood by those skilled in the art that, various modifications, combinations, sub-combinations and substitutions may be made, according to design requirements and other factors. Any modification, equivalent replacement, and improvement made within the spirit and principle of the present disclosure should be included in the protection scope of the present disclosure.

What is claimed is:

1. An instruction prefetching method, comprising:
   before a processor core fetches a required instruction from a target buffer corresponding to the processor core, precompiling instructions in the target buffer; and
   in response to determining that a jump instruction exists in the target buffer and a first jump target instruction corresponding to the jump instruction is not cached in the target buffer according to a precompiled result, prefetching the first jump target instruction from an instruction cache (icache) into a candidate buffer corresponding to the processor core to wait for the processor core to fetch the first jump target instruction from the candidate buffer;
   wherein the target buffer and the candidate buffer are alternately reused during instruction prefetching;
   wherein precompiling the instructions in the target buffer comprises:
   precompiling the instructions in the target buffer by using a branch prediction algorithm;
   wherein after precompiling the instructions in the target buffer, the method further comprises:
   in response to receiving prediction failure information, sequentially executing an instruction address matching using a register of the target buffer and a register of the candidate buffer in a process of executing a target jump instruction by the processor core, to determine a buffer where a second jump target instruction corresponding to the target jump instruction is located.

2. The method of claim 1, wherein prefetching the first jump target instruction from the icache into the candidate buffer corresponding to the processor core comprises:
   taking an instruction address of the first jump target instruction as a head address, prefetching a preset number of instructions from the icache, and caching the preset number of instructions into the candidate buffer corresponding to the processor core, wherein the first jump target instruction is comprised in the preset number of instructions.

3. The method of claim 1, wherein prefetching the first jump target instruction from the icache into the candidate buffer corresponding to the processor core comprises:
   determining whether the first jump target instruction is cached in the candidate buffer corresponding to the processor core; and
   in response to determining that the first jump target instruction is not cached in the candidate buffer corresponding to the processor core, prefetching the first jump target instruction from the icache into the candidate buffer.

4. The method of claim 1, wherein in response to the processor core fetching the first jump target instruction from the candidate buffer, a current instruction fetching buffer is switched from the target buffer to the candidate buffer; and
   the method further comprises:
   before the processor core fetches the first jump target instruction corresponding to the jump instruction from the candidate buffer, precompiling instructions in the candidate buffer.

5. The method of claim 1, further comprising:
   in response to determining that the second jump target instruction corresponding to the target jump instruction is not in the target buffer and not in the candidate buffer based on the instruction address matching, taking an address of the second jump target instruction corresponding to the target jump instruction as a head address, prefetching a preset number of instructions from the icache and caching the preset number of instructions into the candidate buffer.

6. The method of claim 1, further comprising:
   in response to determining that no jump instruction exists in the target buffer according to the precompiled result, prefetching a preset number of instructions from the icache into the candidate buffer based on an instruction with a maximum instruction address in the target buffer.

7. An electronic device, comprising:
   at least one processor; and
   a memory, communicatively coupled to the at least one processor; wherein:
   the memory stores instructions executable by the at least one processor;
   when the instructions are executed by the at least one processor, the at least one processor is caused to perform an instruction prefetching method, comprising:
   before a processor core fetches a required instruction from a target buffer corresponding to the processor core, precompiling instructions in the target buffer; and
   in response to determining that a jump instruction exists in the target buffer and a first jump target instruction corresponding to the jump instruction is not cached in the target buffer according to a precompiled result, prefetching the first jump target instruction from an instruction cache (icache) into a candidate buffer corresponding to the processor core to wait for the processor core to fetch the first jump target instruction from the candidate buffer;
   wherein the target buffer and the candidate buffer are alternately reused during instruction prefetching;
   wherein precompiling the instructions in the target buffer comprises:
   precompiling the instructions in the target buffer by using a branch prediction algorithm;
   wherein after precompiling the instructions in the target buffer, the at least one processor is further caused to perform:
   in response to receiving prediction failure information, sequentially executing an instruction address matching using a register of the target buffer and a register of the candidate buffer in a process of executing a target jump instruction by the processor core, to determine a buffer where a second jump target instruction corresponding to the target jump instruction is located.

8. The electronic device of claim 7, wherein prefetching the first jump target instruction from the icache into the candidate buffer corresponding to the processor core comprises:
   taking an instruction address of the first jump target instruction as a head address, prefetching a preset number of instructions from the icache, and caching the preset number of instructions into the candidate buffer corresponding to the processor core, wherein the first jump target instruction is comprised in the preset number of instructions.

9. The electronic device of claim 7, wherein prefetching the first jump target instruction from the icache into the candidate buffer corresponding to the processor core comprises:
   determining whether the first jump target instruction is cached in the candidate buffer corresponding to the processor core; and
   in response to determining that the first jump target instruction is not cached in the candidate buffer corresponding to the processor core, prefetching the first jump target instruction from the icache into the candidate buffer.

10. The electronic device of claim 7, wherein in response to the processor core fetching the first jump target instruction from the candidate buffer, a current instruction fetching buffer is switched from the target buffer to the candidate buffer; and
   the at least one processor is further caused to perform:
   before the processor core fetches the first jump target instruction corresponding to the jump instruction from the candidate buffer, precompiling instructions in the candidate buffer.

11. The electronic device of claim 7, wherein the at least one processor is further caused to perform:
   in response to determining that the second jump target instruction corresponding to the target jump instruction is not in the target buffer and not in the candidate buffer based on the instruction address matching, taking an address of the second jump target instruction corresponding to the target jump instruction as a head address, prefetching a preset number of instructions from the icache and caching the preset number of instructions into the candidate buffer.

12. The electronic device of claim 7, wherein the at least one processor is further caused to perform:
   in response to determining that no jump instruction exists in the target buffer according to the precompiled result, prefetching a preset number of instructions from the icache into the candidate buffer based on an instruction with a maximum instruction address in the target buffer.

13. A non-transitory computer readable storage medium having computer instructions stored thereon for causing a computer to perform an instruction prefetching method, comprising:
   before a processor core fetches a required instruction from a target buffer corresponding to the processor core, precompiling instructions in the target buffer; and
   in response to determining that a jump instruction exists in the target buffer and a first jump target instruction corresponding to the jump instruction is not cached in the target buffer according to a precompiled result, prefetching the first jump target instruction from an instruction cache (icache) into a candidate buffer corresponding to the processor core to wait for the processor core to fetch the first jump target instruction from the candidate buffer;
   wherein the target buffer and the candidate buffer are alternately reused during instruction prefetching;
   wherein precompiling the instructions in the target buffer comprises:
   precompiling the instructions in the target buffer by using a branch prediction algorithm;
   wherein after precompiling the instructions in the target buffer, the computer is further caused to perform:
   in response to receiving prediction failure information, sequentially executing an instruction address matching using a register of the target buffer and a register of the candidate buffer in a process of executing a target jump instruction by the processor core, to determine a buffer where a second jump target instruction corresponding to the target jump instruction is located.

14. The non-transitory computer readable storage medium of claim 13, wherein prefetching the first jump target instruction from the icache into the candidate buffer corresponding to the processor core comprises:
   taking an instruction address of the first jump target instruction as a head address, prefetching a preset number of instructions from the icache, and caching the preset number of instructions into the candidate buffer corresponding to the processor core, wherein the first jump target instruction is comprised in the preset number of instructions.

15. The non-transitory computer readable storage medium of claim 13, wherein prefetching the first jump target instruction from the icache into the candidate buffer corresponding to the processor core comprises:
   determining whether the first jump target instruction is cached in the candidate buffer corresponding to the processor core; and
   in response to determining that the first jump target instruction is not cached in the candidate buffer corresponding to the processor core, prefetching the first jump target instruction from the icache into the candidate buffer.

16. The non-transitory computer readable storage medium of claim 13, wherein in response to the processor core fetching the first jump target instruction from the candidate buffer, a current instruction fetching buffer is switched from the target buffer to the candidate buffer; and
   the computer is further caused to perform:
   before the processor core fetches the first jump target instruction corresponding to the jump instruction from the candidate buffer, precompiling instructions in the candidate buffer.

* * * * *